United States Patent Office 2,728,371
Patented Dec. 27, 1955

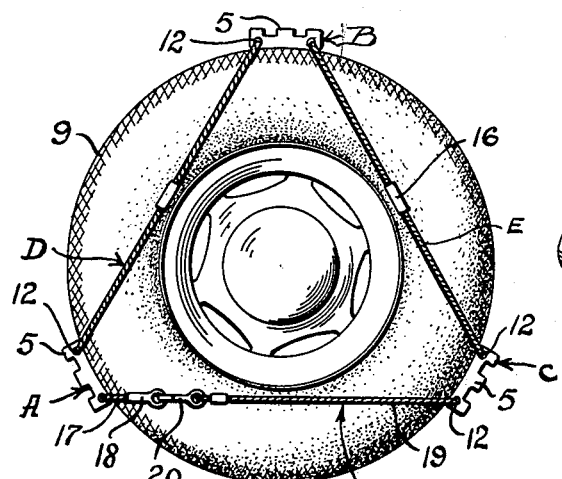
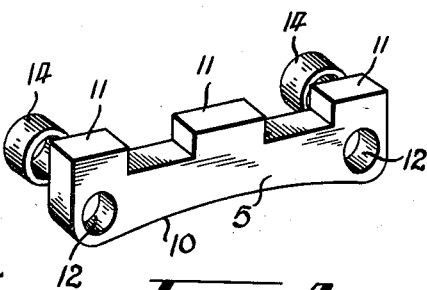
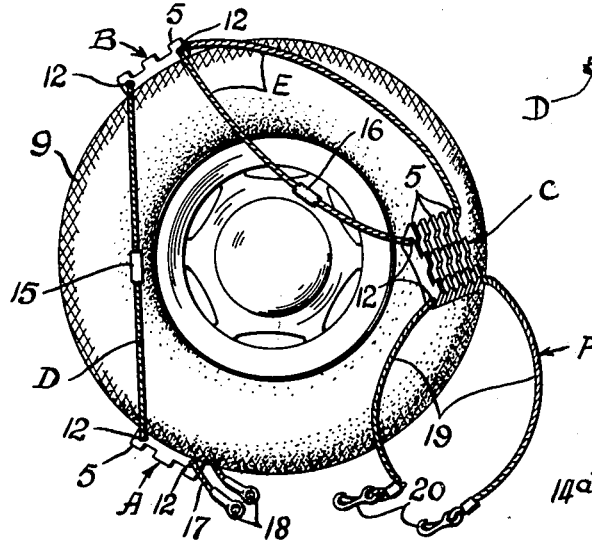
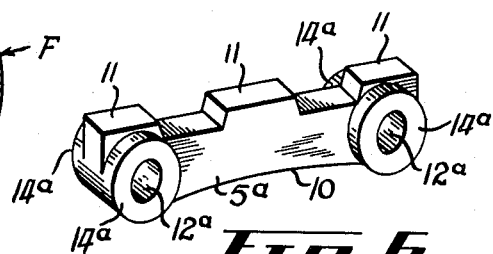
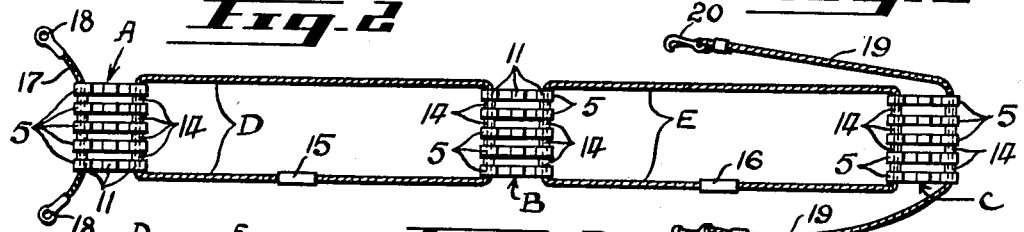

2,728,371

ANTI-SKID DEVICES FOR AUTOMOBILE TIRES

Ivan A. McCarthy, Montreal, Quebec, Canada, assignor of twenty-five per cent to R. A. Armitage, Montreal, Quebec, Canada Application June 22, 1953, Serial No. 362,999

8 Claims. (Cl. 152—226)

This invention relates to improvements in anti-skid devices for automobile tires for the purpose of providing an increased traction to a tire tread surface with a slippery road surface or with a surface covered with a loose coating such as mud, snow, and the like.

The principal object of this invention is to provide a novel arrangement of traction or anti-skid cleats for quick and easy placement about the tread surface of a tire or removal from same.

A particular feature of this consists in the provision of series of laterally disposed circumferentially extending cleats at substantially equidistant intervals about the tread surface of a tire and uniting said series of cleats by flexible loops which extend through the cleats to straddle the tire, providing a triangular interconnection between said series of cleats at opposite sides of the tire.

A further object is to provide flexible loop attachments of the character described between the series of cleats in which only one of said loops need be separable to facilitate placement of the anti-skid device about a tire or for removal of same.

The above and other objects, advantages and characteristic features of this invention will be understood more readily from the following detailed description taken in connection with the accompanying drawing, in which—

Fig. 1 is an elevational view showing an anti-skid device embodying my invention secured about a tire.

Fig. 2 is a view similar to Fig. 1 but illustrating the manner in which my anti-skid device is emplaced about a tire.

Fig. 3 is a plan view of my anti-skid device.

Fig. 4 is a perspective view of one type of cleat.

Fig. 5 is a perspective view showing a modified type of cleat.

Fig. 6 is a perspective view showing a still further modification of the cleat.

Fig. 7 is a fragmentary plan view illustrating the manner in which the cleat shown in Fig. 6 is arranged in series.

Referring more particularly to the drawings, my anti-skid device comprises a plurality of series A, B and C of cleats 5 connected by loops D, E and F for disposition of each series in spaced apart relation about the tread portion of a tire 9, as shown in Fig. 1.

According to one embodiment of the invention illustrated in Figs. 2 to 4, each cleat 5 comprises an elongated block or strip of metal, or other wear-resistant material, having one surface curved in the longitudinal direction as indicated at 10, and provided on its opopsite surface with longitudinally spaced teeth 11. Transverse openings 12 extend through the sides of said cleats at opposite ends thereof.

The cleats 5 of each series are disposed in spaced side-by-side relation with hollow spacers 14 therebetween aligned with corresponding openings 12 in the cleats. The series A is connected to series B by loop D comprising a cable extending freely through the openings 12 and aligned spacers 14 at adjacent ends of the cleats of each series. The cable has its ends secured together, as indicated at 15, to provide an endless loop of a predetermined length.

The series B and C are similarly connected by loop E, also comprising a cable extending freely through the openings 12 and aligned spacers at adjacent ends of the cleats of series B and C. The cable forming loop E is secured at its ends, as indicated at 16, to provide an endless loop of a length substantially equal to loop D. The series A and C are connectable by loop F which comprises a pair of cables including a short cable 17 extending freely through the openings 12 and aligned spacers 14 at the remaining end of the cleats of series A, the free ends of cable 17 being provided with eyelets 18. A second cable 19 of substantially greater length than cable 17, extends freely through the openings 12 and aligned spacers 14 at the remaining end of the cleats of series C, the free ends of cable 19 being provided with hooks 20 which are engageable with the eyelets 18 of cable 17 to form the aforesaid loop F.

As illustrated in Fig. 2, my anti-skid device is fitted to tire 9 with the concavely curved surface 10 of each cleat 5 extending longitudinally along the tread surface of the tire so that the series of cleats A, B and C are placed at points about the circumference of the tire substantially equidistant from one another with the loops D and E straddling the tire. One hook 20 of cable 19 is then connected to an eyelet 18 on the corresponding side of cable 17. Then the remaining hook 20 of cable 19 is connected to the remaining eyelet 18 so that the loop F formed thereby straddles the tire between the series A and C of cleats 5.

It will be seen that my anti-skid device, when emplaced about the tire 9, provides three gripping areas, formed by the series A, B and C of cleats 5 which are substantially equally spaced from one another about the circumference of the tire on the tread surface thereof. These series of cleats are secured in their spaced relation by the loops D, E and F which straddle the tire forming a triangular retainer along each side wall of the tire for my anti-skid device.

When emplacing the device about a tire, the loops D and E, being freely extended through the series of cleats, permit ready adjustment of the cleats for centering same with respect to the tread surface. In order to connect up the cables 17 and 19, corresponding sides of these cables may be extended by running the cables through the free openings in the adjacent ends of the cleats of each series A and C. After the ends on one side have been connected the opposite sides may then be drawn together for connection by running the cables in the reverse direction through the said cleat openings.

Figs. 6 and 7 illustrate a modified arrangement of a series of cleats. The cleats designated 5a are provided with integrally formed collar-like members 14a at opposite sides of the openings 12, which, when the cleats 5a are disposed in series, as shown in Fig. 7, serve as spacers between the cleats. The edges of collars 14a are bevelled toward openings 12a to prevent a shearing action between the collars of adjacent cleats.

Fig. 5 illustrates a further modified form of cleat 5b. The cleat is rectangular as viewed in side elevation and is provided with an enlarged central opening 12b through which adjacent ends of two loops, for example D and E, extend. The series of cleats 5b may be disposed in abutting side-by-side relation across the width of a tire tread, as shown in Fig. 5, or may be separated by spacers of the type indicated at 14 or at 14a in Figs. 4 and 6. Cleats 5b are free to rotate about the portions of the loops extending therethrough to permit friction contact with road surfaces to be distributed about the four edges of the cleat and thus prolong the life of same.

Although I have shown the preferred embodiments of my invention for illustration purposes, it will be apparent that further modifications may be resorted to without departing from the scope and spirit of this invention as defined by the appended claims. For example, the cleats 5 and 5a may also be provided with teeth corresponding to teeth 11 on two opposing faces so that the device may be reversible to prolong the life of the gripping surfaces of the cleat. Additionally, while I have shown a specific example of three longitudinally spaced teeth 11 of a certain configuration, I do not limit myself to this specific number of teeth or to their configuration.

What I claim is:

1. An anti-skid device of the character described, including a plurality of series of cleats arranged at intervals about the tread of a tire, each series comprising a plurality of rigid cleats in which each cleat is disposed circumferentially of the tire tread and in spaced side-by-side relation with adjacent cleats of the series, and flexible loop forming members straddling the tire through transverse openings in the said cleats of adjacent series and having intermediate portions disposed along opposite side walls of the tire between adjacent series.

2. An anti-skid device as set forth in claim 1, in which the said plurality of series of cleats are disposed substantially equidistantly circumferentially of the tire and in which the loop forming members between said series of cleats conjointly provide a triangular retainer about opposite sides of the tire.

3. An anti-skid device as set forth in claim 1, in which said loop forming members are trained through the openings in said cleats for free sliding movement of said members relative to said cleats.

4. An anti-skid device as set forth in claim 1, in which said cleats are shaped to provide an elongated wearing surface in the circumferential direction of the tire and in which said elongated wearing surface is provided with longitudinally spaced teeth.

5. An anti-skid device as set forth in claim 1, including means interposed between adjacent cleats in each series to maintain them in spaced apart relation.

6. An anti-skid device as set forth in claim 5, in which said means comprises separate interposed spacer elements.

7. An anti-skid device as set forth in claim 5, in which said means comprises spacer elements integrally formed with said cleats.

8. An anti-skid device, as set forth in claim 5, in which said means comprises spacer elements integrally formed with and on opopsite sides of said cleats, said spacer elements being provided with openings registering with the transverse openings in said cleats, said spacer elements having their side edges bevelled toward the openings therein to prevent a shearing action between adjacent spacer elements on said loop forming member.

References Cited in the file of this patent

UNITED STATES PATENTS

| | | |
|---|---|---|
| 968,415 | Reagan | Aug. 23, 1910 |
| 1,307,036 | Bretscher | June 17, 1919 |
| 1,417,130 | Ayers | May 23, 1922 |
| 1,567,275 | Klein | Dec. 29, 1925 |
| 2,082,937 | Bambenek | June 8, 1937 |